United States Patent
Lee et al.

(10) Patent No.: US 8,301,271 B2
(45) Date of Patent: Oct. 30, 2012

(54) SMART POWER MANAGEMENT SYSTEM AND METHOD THEREOF

(75) Inventors: Yu-Lung Lee, Miaoli County (TW); Ming-Chou Kuo, Taipei (TW); Tsung-Chih Lin, Taipei Hsien (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 260 days.

(21) Appl. No.: 12/727,555

(22) Filed: Mar. 19, 2010

(65) Prior Publication Data
US 2011/0087904 A1    Apr. 14, 2011

(30) Foreign Application Priority Data
Oct. 9, 2009   (TW) ............................. 98134352 A

(51) Int. Cl.
*G06F 19/00*     (2006.01)
(52) U.S. Cl. .......................................... 700/18; 700/86
(58) Field of Classification Search ............... 700/18–19, 700/86; 307/38–41, 112, 116, 125, 139; 713/340
See application file for complete search history.

(56) References Cited

U.S. PATENT DOCUMENTS

| | | | | |
|---|---|---|---|---|
| 4,190,800 A * | 2/1980 | Kelly et al. | ................ | 340/12.33 |
| 4,780,910 A * | 10/1988 | Huddleston et al. | .......... | 398/109 |
| 5,278,771 A * | 1/1994 | Nyenya | .......................... | 700/293 |
| 6,178,253 B1 * | 1/2001 | Hendrickson et al. | ........ | 382/110 |
| 6,874,691 B1 * | 4/2005 | Hildebrand et al. | ............ | 236/51 |
| 7,274,975 B2 * | 9/2007 | Miller | ............................ | 700/295 |
| 7,561,977 B2 * | 7/2009 | Horst et al. | ..................... | 702/62 |

* cited by examiner

*Primary Examiner* — Kidest Bahta
(74) *Attorney, Agent, or Firm* — Rosenberg, Klein & Lee

(57) ABSTRACT

The present invention provides a smart power management system, comprising a power management apparatus and at least one electric socket device. The plurality of electric socket devices produce a second wireless signal according to power consumption, and the power management apparatus receives the second wireless signal and computes relevant cost or the carbon footprint information shown on a display unit for reference. In addition, the power management apparatus also compares a setup signal inputted by a user to the second wireless signal, the electricity cost or the carbon footprint information to produce a first wireless signal, thereby controlling the plurality of electric socket devices for providing power supply or stopping power supply.

19 Claims, 5 Drawing Sheets

SMART POWER MANAGEMENT SYSTEM AND METHOD THEREOF

BACKGROUND OF THE INVENTION

1. Field of the Invention

The present invention relates to a power management system, in particular, to a power management system enabling the detection of power consumption.

2. Description of Related Art

As shown in FIG. 1, a conventional electrical receptacle 1a, an electric extension cord receptacle 1b or an anti-surge electric socket etc. are all categorized as a conventional power socket system. The electric extension cord receptacle 1b comprises a plurality of electric sockets 12 and a plurality of corresponding switches 11, in which the electric extension cord receptacle 1b may be connected to a power network (not shown) through a electric power cord 14 and a electric plug 13 thereby acquiring the power source from the power network, and also connected to a plurality of electronic devices or appliances, such as a computer 15 or a television set 16. Besides, the conventional electrical receptacle 1a may be connected to an air conditioning system 17 for providing the driving power.

The aforementioned conventional power socket system is simply capable of providing electronic devices or appliances individually connected thereon with electrical power, rather than being enabled to offer any power management features, nor operable for transmission and management functions of module information. Therefore, users can appreciate the condition of electricity usage only through alternatively delivered electricity bills.

Suppose the user can be aware of and even further allowed to schedule power consumption for each electronic device or appliance, it would facilitate the user to perform power supervision and management more efficiently, thereby achieving the purposes of power-saving as well as carbon footprint reduction.

SUMMARY OF THE INVENTION

In accordance with an embodiment of the present invention, there provides a smart power management system, comprising: a power management apparatus including: a display unit, which receives a first control signal for displaying; a memory unit, which is pre-installed with default information and stored signal information; a first wireless module, which receives a second wireless signal or generates a first wireless signal based on a second control signal; a first processing unit, which is electrically connected to the display unit, the memory unit and the first wireless module, receives the second wireless signal and accordingly generates the first control signal or stores the signal information included within the second wireless signal, or alternatively computes and compares based on the default information and the signal information to generate the second control signal; a electric socket device, which includes: a power output unit for outputting electric power; a switch unit, which is electrically connected to the power output unit for controlling the power output unit to enable power supply or stop power supply based on a third control signal; a second wireless module, which receives the first wireless signal, or generates the second wireless signal based on a fourth control signal; and a second processing unit, which is electrically connected to the switch unit and the second wireless module so as to generate the fourth control signal or receive the first wireless signal, thereby accordingly generating the third control signal.

In accordance with an embodiment of the present invention, there provides a smart power management system, comprising: a electric socket device, which is configured with a power output unit for outputting electric power, and generates a second wireless signal based on power consumption in the power output unit; and a power management apparatus, which receives the second wireless signal and accordingly computes and generates a result displayed on a display unit; wherein the power management apparatus is allowed to input a setup signal and accordingly generates a first wireless signal, and the electric socket device receives the first wireless signal and thus individually controls the plurality of power output units for providing power supply or stopping power supply.

In accordance with an embodiment of the present invention, there provides a method of smart power management, comprising: providing a power management apparatus which receives a setup signal and generates a first wireless signal based on the setup signal; and providing a electric socket device which receives the first wireless signal and accordingly controls the electric socket device to provide power supply or stop power supply; wherein the electric socket device generates a second wireless signal based on the outputted power and the power management apparatus receives the second wireless signal and accordingly generates a result displayed on a display unit.

DETAILED DESCRIPTION OF THE PREFERRED EMBODIMENTS

Figure 1:
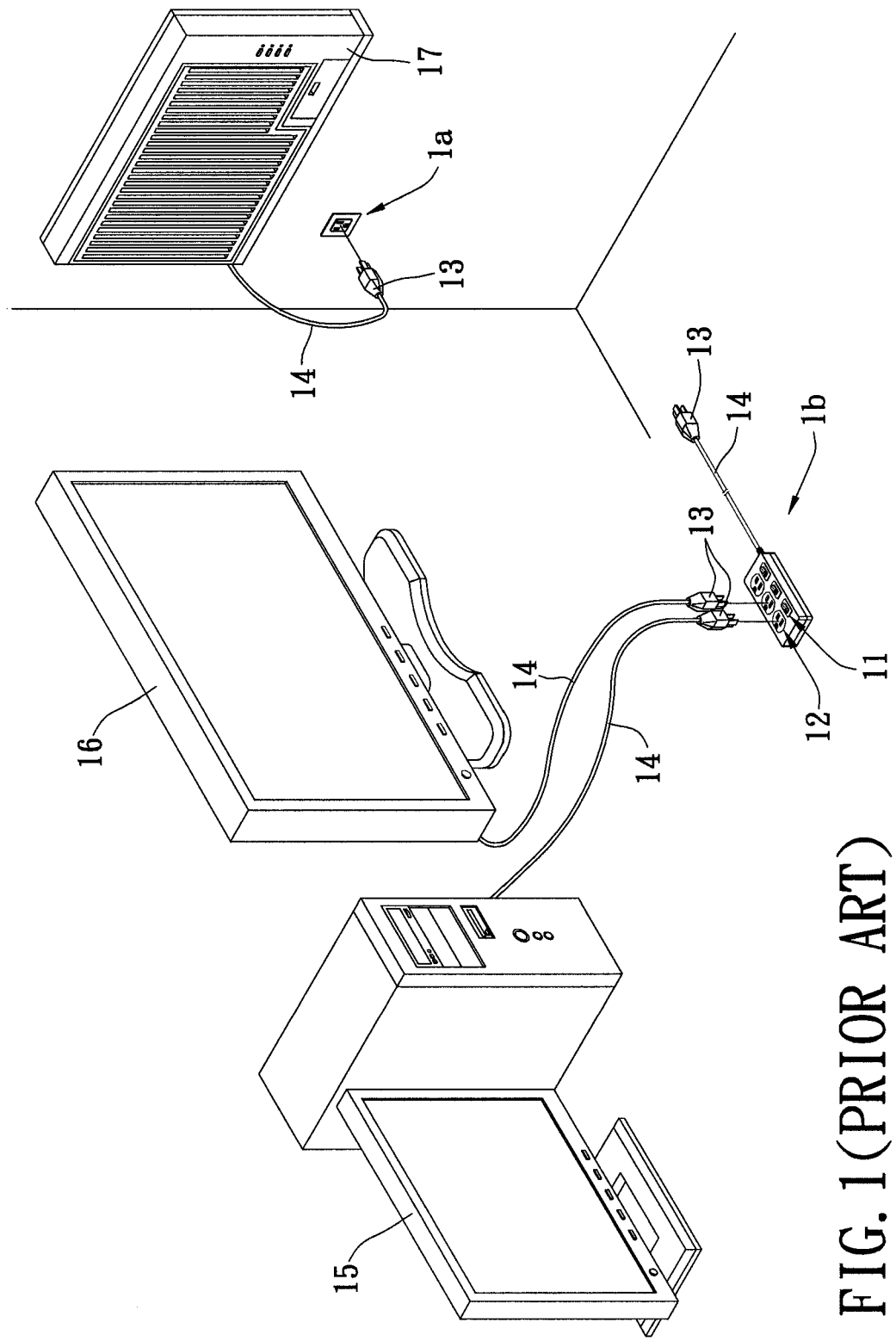
FIG. 1 shows a schematic diagram of a conventional power socket system.
Figure 2:
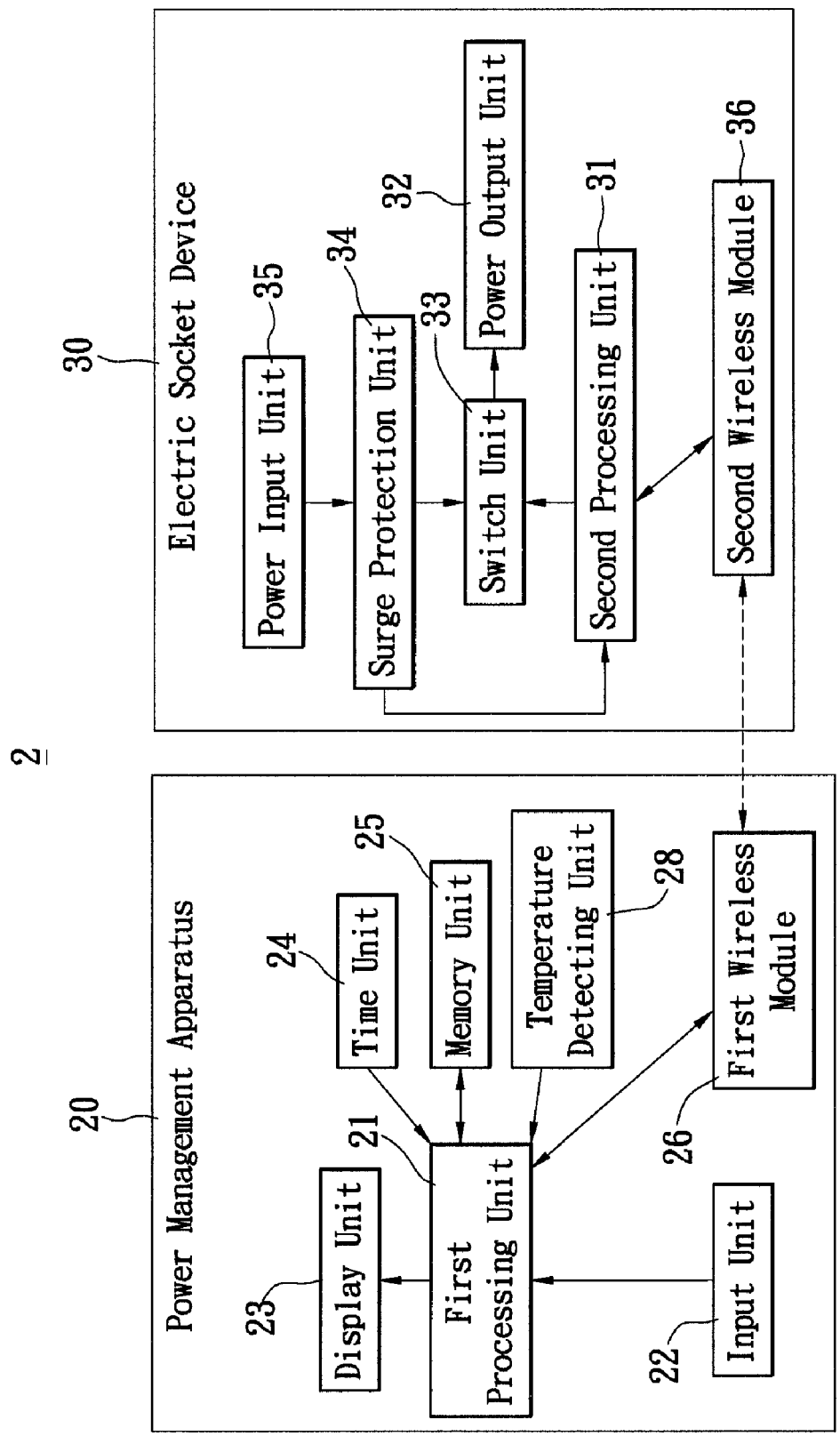
FIG. 2 shows a diagram for system modules of the smart power management system according to an embodiment of the present invention.

Refer now to FIG. 2. The illustrated power management apparatus 20, suitable for use for monitoring power consumption of an electrical appliance and adapted for power-saving management, comprises: an input unit 22 allowing a user to input a setup signal to a first processing unit 21 and to have it stored in a memory unit 25; a display unit 23 receiving the first control signal from the first processing unit 21 to display the information; a time unit 24 generating a time signal to the first processing unit 21, providing the timing feature and also generating a timing signal to the first processing unit 21; the memory unit 25 allowing to store default information and signal information, in which the default information may include the electric power cost information, power consumption and carbon footprint and other relevant information, and the signal information indicates the information included within the second wireless signal transmitted from the electric socket device 30; a first wireless module 26 is able to receive a second wireless signal and transmit it to the first processing unit 21, or alternatively receive the second control signal from the first processing unit 21 so as to send a first wireless signal; and a temperature detecting unit 28 is able to detect the ambient temperature and accordingly generate a temperature detection signal to the first processing unit 21.

The electric socket device 30 comprises: a power input device 35 connected to a power line network (not shown) through an electric power cord (not shown) and an electric plug (not shown); a surge protection unit 34 enabling a surge protection feature; a switch unit 33 allowing to receive a power signal and transmit the power signal to the power output unit 32, thereby enabling the switch unit 33 to control the power supply of the power output unit 32; a second processing unit 31 generating a third control signal to control the ON or OFF status in the switch unit 33, and also generating a fourth control signal to control a second wireless module 36 to emit a second wireless signal; and the second wireless module 36 also receiving a first wireless signal and transmitting to the second processing unit 31. Herein the power output unit 32 may include a plurality of electric sockets, and the switch unit 33 is allowed to individually control providing or stopping power supply to the plurality of electric sockets.

The power management apparatus 20 may be also enabled to collect power consumption in the electric socket device 30 and convert the collected power consumption into information relating to electricity fees or carbon footprint. The second processing unit 31 in the electric socket device 30 computes power consumption statistics by means of the switch unit 33 and then transfers to the first processing unit 21 in the power management apparatus 20; the first processing unit 21 executes computations incorporated with the default information installed within the memory unit 25, thereby accordingly controlling the display unit 23 to show information, e.g., power consumption, payable amount, carbon footprint and so forth, for each or the plurality of electric socket devices 30.

The power management apparatus 20 may be also configured with the function of power supply management on the electric socket device 30. The input unit 22 receives the setup signal inputted by the user, and compares the setup signal through the first processing unit 21 with the power consumption information in the electric socket device 30. Thus, the power management apparatus 20 controls the electric socket device 30 to stop power supply when the accumulated power consumption is greater than or equal to the upper limit of the power consumption indicated in the setup signal. Similarly, the user is also allowed to input the setup signal indicating the upper limit amount of the electric power cost or the carbon footprint etc., so as to effectively perform energy management on each or the plurality of electric socket devices 30.

The power management apparatus 20 may be also capable of providing a feature of temperature detection and management. The temperature detecting unit 28 in the power management apparatus 20 detects ambient temperature, and accordingly generates a temperature detection signal. The first processing unit 21 receives such a temperature detection signal and has it displayed on the display unit 23. Furthermore, based on a temperature setup signal, it is possible to control the power output unit 32 to provide power for driving an appliance, and to initiate different appliances, e.g., an air conditioner or an electrical fan, in accordance with various temperatures.

Additionally, the power management apparatus 20 may be configured with a feature of power supply cycle. The user is allowed to input a setup signal containing the time information, and the first processing unit 21 compares the setup signal with the time signal generated by the time unit 24. Hence, the power management apparatus 20 is enabled to control the power supply cycle for each or the plurality of the electric socket devices 30 based on the comparison result of the setup signal and the time signal.

The power management apparatus 20 may be able to provide a function of power cut-off timing as well. Upon the occurrence of power outage, the start time of the power cut-off can be shown on the display unit 23 and the time unit 24 begins to count. As soon as power supply is received once again, the power management apparatus 20 then displays both the end time of the power cut-off and the elapsed duration for the power cut-off.

The power management apparatus 20 may facilitate surge protection feature. A surge protection unit 34 is connected between the power input unit 35 and the switch unit 33, thereby absorbing or blocking the unwanted surge signals. Besides, the second processing unit 31 may read out relevant surge information concerning the absorption or blockage in the surge protection unit 34. The power management apparatus 20 subsequently performs statistical operations and categorizes in accordance with the magnitude of such surge signals in Joules displayed on the display unit 23.

The power management apparatus 20 may control the plurality of electric socket devices 30. The power management apparatus 20 is allowed to perform wireless signal transmissions with the plurality of electric socket devices 30 simultaneously via the first wireless module 26, thereby controlling the plurality of electric socket devices 30, collecting relevant information regarding the plurality of electric socket devices 30, and respectively or collectively displaying information concerning the plurality of electric socket devices 30 and the like.

Figure 3:
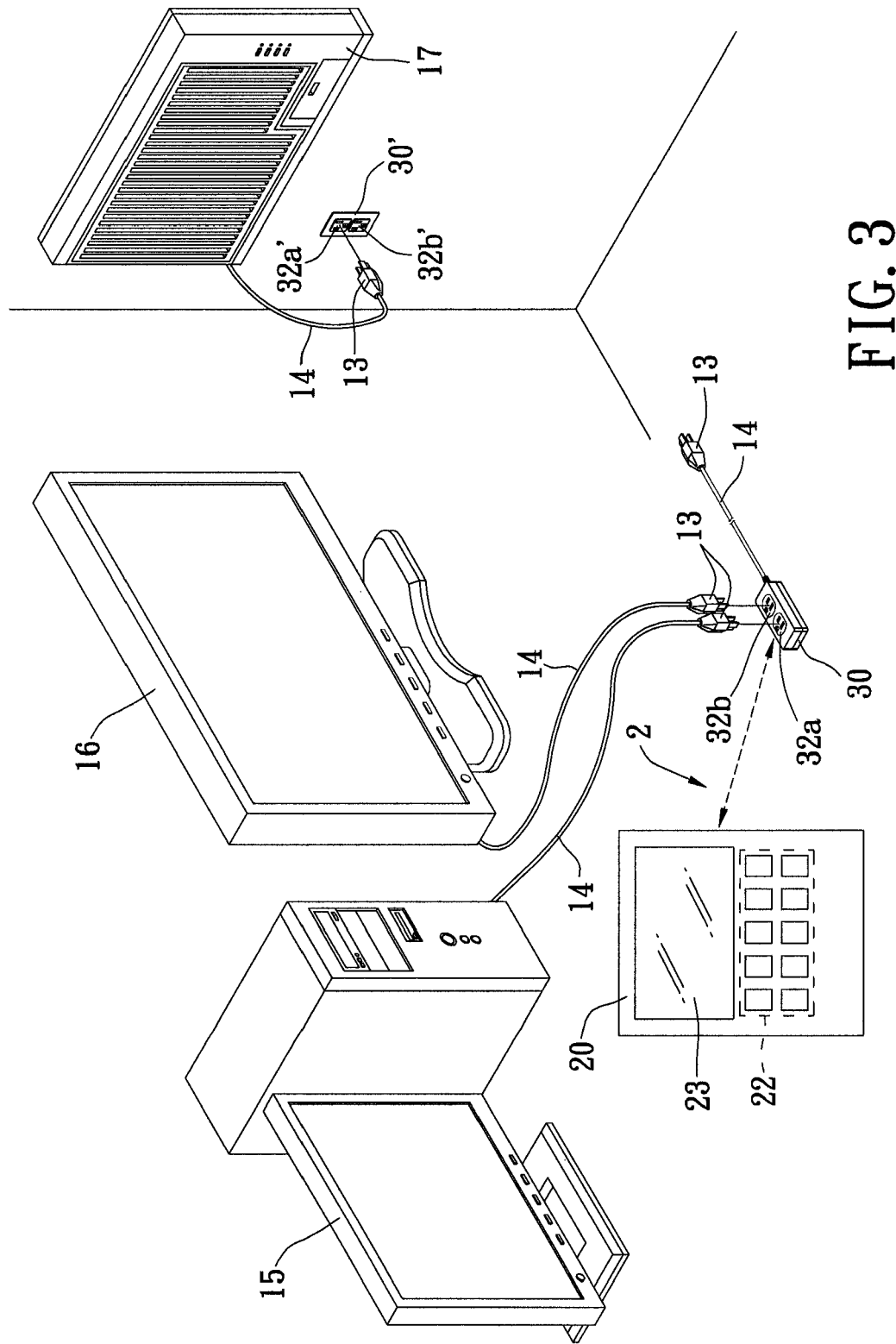
FIG. 3 shows a schematic diagram of the smart power management system according to a first embodiment of the present invention.

Next, referring conjunctively to FIGS. 2 and 3, in which the smart power management system 2 comprises a power management apparatus 20, a plurality of electric socket devices 30, 30' and a plurality of electric sockets 32a, 32b, 32a', 32b'.

After startup of a computer 15, a television set 16 or an air conditioning system 17, the electric socket device 30, 30' respectively transfers the conditions about power consumption, surge protection etc. currently exhibiting in individual electric sockets 32a, 32b, 32a' to the power management apparatus 20, which are shown on the display unit 23.

The power management apparatus 20 can control the plurality of electric socket devices 30, 30' based on the setup signal inputted by the user such as time information, power consumption information or temperature information, within a specific period of time or else under a certain condition of power consumption or temperature.

Figure 4:
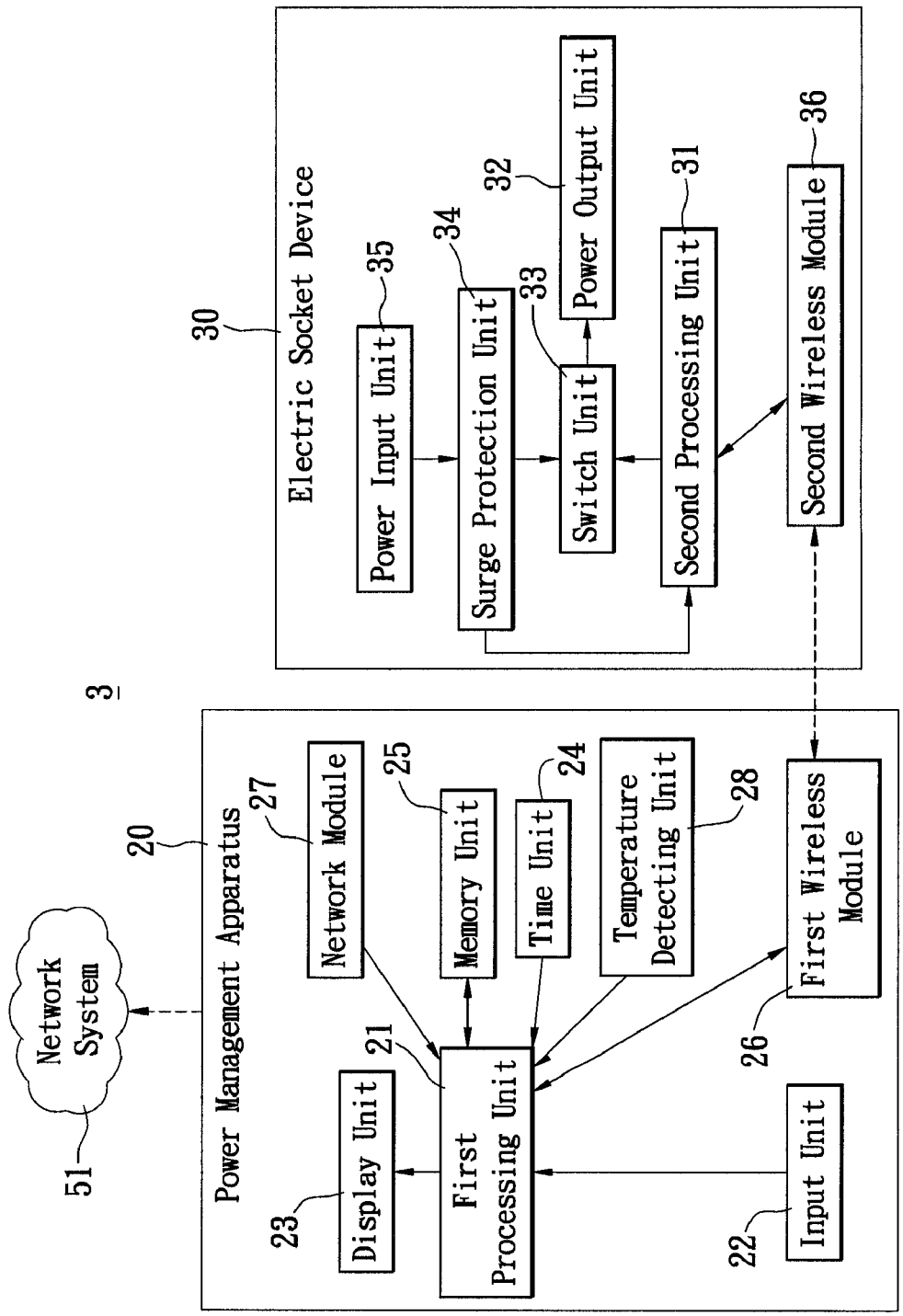
FIG. 4 shows a diagram for modules of the smart power management system according to a second embodiment of the present invention.

Refer now to FIG. 4, wherein the power management apparatus 40 includes a network module 27. That is, the first processing unit 21 is allowed to be connected to a network system 51 by means of the network module 27 to access information required.

Therefore, the power management apparatus 40 can obtain in real time the power cost information via connections to the power company by means of the network system 51, and has the most recent information about electricity fees or carbon footprint information displayed. Besides, it is also possible to remotely access and control the power management apparatus 40 through the network system 51.

Figure 5:
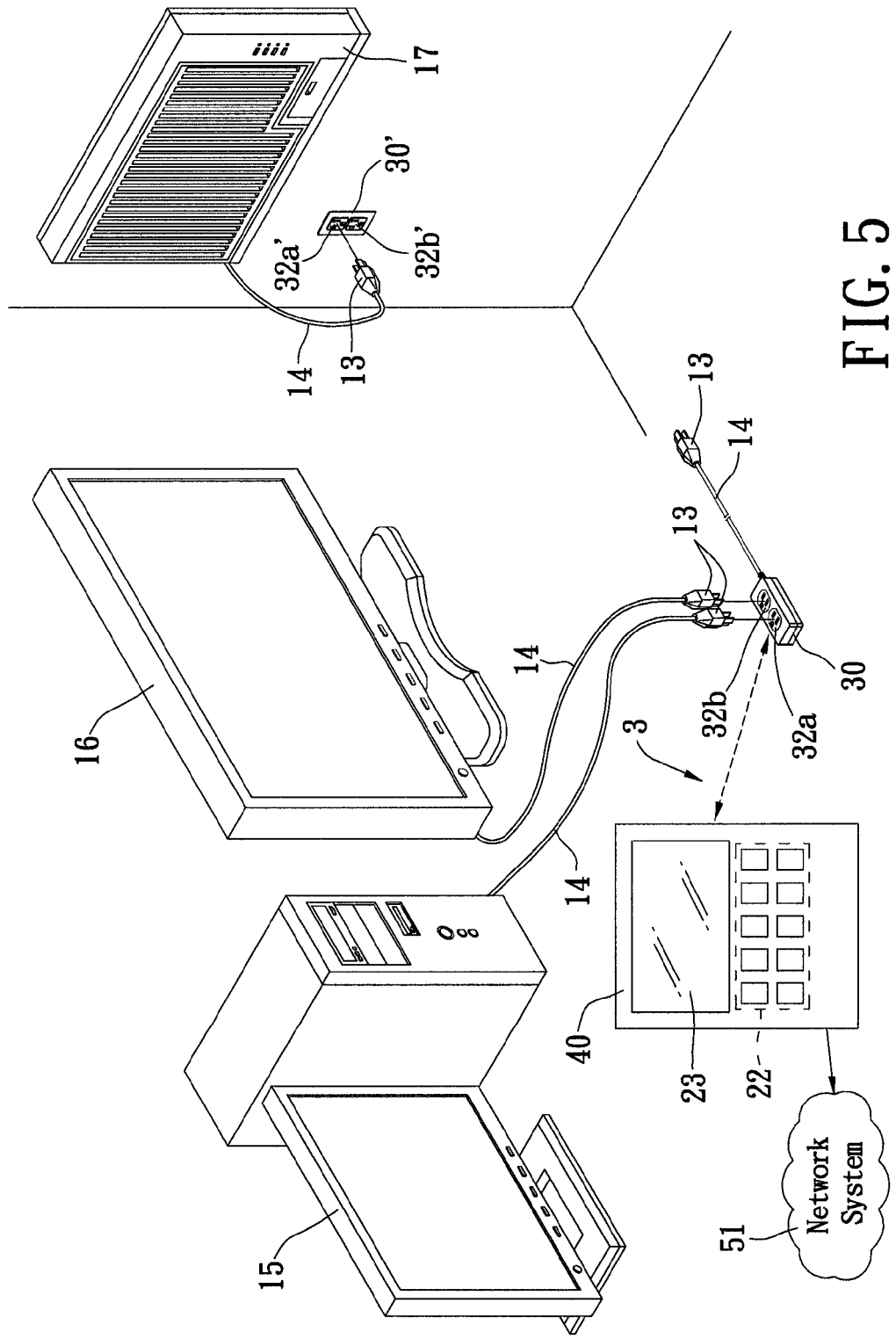
FIG. 5 shows a schematic diagram of the smart power management system according to the second embodiment of the present invention.

Referring conjunctively to FIGS. 4 and 5, in which the smart power management system 3 comprises a network system 51 in connection with a power management apparatus 40. Consequently, the power management apparatus 40 is enabled to automatically link to the power company through the network system 51 for acquiring information concerning the most up-to-date electric power cost and carbon footprint. Thus, the power management apparatus 40 can accordingly provide the most accurate information in terms of electric power cost and carbon footprint.

Furthermore, the user is able to control the power management apparatus 40 remotely via the network system 51, and also allowed to remotely access information such as the conditions regarding power consumption, surge blockage . . . and so forth stored in the power management apparatus 40 through the network system 51.

What is claimed is:

1. A smart power management system, suitable for use for monitoring power consumption of an electrical appliance and adapted for power-saving management, comprising:
    a power management apparatus, comprising:
        a display unit, receiving a first control signal for displaying;
        a memory unit, preprogrammed default information and stored signal information;
        a first wireless module, receiving a second wireless signal or generating a first wireless signal based on a second control signal;
        a first processing unit, being electrically connected to the display unit, the memory unit and the first wireless module, receiving the second wireless signal and generating the first control signal accordingly or storing the signal information contained within the second wireless signal, or alternatively computing and comparing the default information with the signal information, thereby generating the second control signal;
    an electric socket device, including:
        a power output unit for supplying electric power;
        a switch unit, being electrically connected to the power output unit for controlling the power output unit to enable power supply or stop power supply based on a third control signal;
        a second wireless module, receiving the first wireless signal, or generating the second wireless signal based on a fourth control signal; and
        a second processing unit, being electrically connected to the switch unit and the second wireless module so as to generate the fourth control signal or receiving the first wireless signal thereby accordingly generating the third control signal;
    whereby, the first wireless module and the second wireless module are capable of transmitting and receiving signals mutually, so that the power management apparatus controls the electric socket device to be in a conduction state or in a cutoff state in accordance with the third control signal;
    wherein the default information installed within the memory unit consists of electric power cost information or carbon footprint information, the signal information contains power consumption information and surge blockage information relating to the electric socket device, and the first processing unit executes computations from the default information and the signal information contained in the second wireless signal and represents the computation result on the display unit.

2. The system according to claim 1, wherein the power management apparatus further includes an input unit for inputting a setup signal, and the setup signal includes at least one of a time signal, an upper limit for electric power cost, an upper limit for carbon footprint, a temperature setup value and an upper limit for power consumption.

3. The system according to claim 2, wherein the power management apparatus further includes a time unit, which is electrically connected to the first processing unit to generate the time signal, and the first processing unit generates the second control signal based on the time signal and the comparison result of the time signal.

4. The system according to claim 3, wherein, upon the occurrence of power outage, the time unit starts to count and the power management apparatus displays the start time and the end time in the event of a power outage, and displays an elapsed time indicated in a timing signal of the time unit.

5. The system according to claim 1, wherein the power management apparatus further includes a temperature detecting unit which detects the ambient temperature to generate a temperature detection signal, and the power management apparatus displays a temperature signal on the display unit signal based on the temperature detection signal and controls the switch unit in the electric socket device based on the comparison result of the temperature signal and the temperature setup value.

6. The system according to claim 1, wherein the electric socket device further includes a surge protection unit which is connected between the switch unit and a power input unit so as to absorb or block a surge signal inputted from the power input unit.

7. The system according to claim 6, wherein the surge protection unit is further electrically connected to the second processing unit, and the second processing unit generates the fourth control signal based on the surge signal absorbed or blocked by the surge protection unit.

8. The system according to claim 1, wherein the power management apparatus further includes a network module for connecting to a network system and transferring the setup signal to the power management apparatus through the network system.

9. A smart power management system, suitable for use for monitoring power consumption and adapted for power-saving management, comprising:
    an electric socket device, being configured with a power output unit for outputting electric power, and generating a second wireless signal based on power consumption in the power output unit; and
    a power management apparatus, receiving the second wireless signal and accordingly computing and generating a result displayed on a display unit, and the electric socket device and the power management apparatus are communicating with each other thru receiving and transmitting wireless signals;
    wherein the power management apparatus is allowed to input a setup signal, to generate a first wireless signal accordingly and to control the electric socket device to be in a conduction state or in a cutoff state, wherein the electric socket device controls the plurality of power output units respectively for providing power supply or stopping power supply basing on the first wireless signal received;
    wherein the power management apparatus further contains default information and signal information, the default information includes electric power cost information or carbon footprint information, the signal information contains power consumption information and surge blockage information relating to the electric socket device, and the power management apparatus executes computations from the default information and the signal information contained in the second wireless signal and displays the computation result.

10. The system according to claim 9, wherein the electric socket device further includes a second wireless module for generating the second wireless signal, and the power management apparatus further comprises a first wireless module for receiving the second wireless signal, and further includes a first processing unit being electrically connected to the first wireless module by receiving the second wireless signal so as to compute and compare the second wireless signal with default information for generating the result.

11. The system according to claim 10, wherein the power management apparatus further includes a memory unit, the default information and signal information stored in the memory unit, and the first processing unit executes computations from the default information and the signal information contained in the second wireless signal and displays the computation result on the display unit.

12. The system according to claim 11, wherein the power management apparatus further includes an input unit electrically connected to the first processing unit for inputting a setup signal, and the setup signal consists of at least one of a time signal, an upper limit for electric power cost, an upper limit for carbon footprint, a temperature setup value and an upper limit for power consumption.

13. A method of smart power management, suitable for use for monitoring power consumption of an electrical appliance and adapted for power-saving management, comprising:
   providing a power management apparatus for receiving a setup signal and generating a first wireless signal based on the setup signal, the power management apparatus containing default information; and
   providing a electric socket device for receiving the first wireless signal and accordingly controlling the electric socket device to provide power supply or stop power supply;
   wherein, the electric socket device generates a second wireless signal based on the outputted electric power and the power management apparatus receives the second wireless signal, controls the electric socket device to be in a conduction state or in a cutoff state, and accordingly generates a result displayed on a display unit;
   wherein the default information consists of electric power cost information or carbon footprint information, the signal information contains power consumption information and surge blockage information relating to the electric socket device, and the power management apparatus executes computations from the default information and the signal information contained in the second wireless signal.

14. The method according to claim 13, wherein the power management apparatus further comprising:
   the display unit, receiving a first control signal for displaying;
   a memory unit, preprogrammed the default information;
   a first wireless module, receiving the second wireless signal or generating the first wireless signal based on a second control signal;
   a first processing unit, being electrically connected to the display unit, the memory unit and the first wireless module, for receiving the second wireless signal and accordingly generating the first control signal, or alternatively computing and comparing the default information with the signal information to generate the second control signal.

15. The method according to claim 14, wherein the electric socket device further comprising:
   a power output unit for outputting electric power;
   a switch unit, being electrically connected to the power output unit for controlling the power output unit to enable power supply or stop power supply based on a third control signal;
   a second wireless module, receiving the first wireless signal, or generating the second wireless signal based on a fourth control signal; and
   a second processing unit, being electrically connected to the switch unit and the second wireless module so as to generate the fourth control signal or receives the first wireless signal thereby accordingly generating the third control signal.

16. The method according to claim 15, wherein the memory unit is installed therein with the default information and signal information, and the first processing unit executes computations from the default information and the signal information contained in the second wireless signal and displays the result on the display unit.

17. The method according to claim 16, wherein the power management apparatus further includes an input unit for inputting the setup signal, and the setup signal consists of at least one of a time signal, an upper limit for electric power cost, an upper limit for carbon footprint, a temperature setup value and an upper limit for power consumption.

18. The method according to claim 17, wherein the power management apparatus further includes a time unit being electrically connected to the first processing unit to generate a time signal, and the first processing unit generates the second control signal based on the time signal and the comparison result of the time signal.

19. The method according to claim 18, wherein the electric socket device further includes a surge protection unit being connected between the switch unit and a power input unit so as to absorb or block the surge signal inputted from the power input unit, wherein the surge protection unit is further electrically connected to the second processing unit, and the second processing unit generates a fourth control signal based on the surge signal absorbed or blocked by the surge protection unit.

* * * * *